Sept. 8, 1959  D. S. BATES  2,903,276

PRINTING DEVICES

Filed Oct. 2, 1956

Inventor
Darwin S. Bates

By Wallace and Cannon
Attorneys

United States Patent Office 2,903,276
Patented Sept. 8, 1959

2,903,276

PRINTING DEVICES

Darwin S. Bates, East Cleveland, Ohio, assignor to Addressograph-Multigraph Corporation, Cleveland, Ohio, a corporation of Delaware Application October 2, 1956, Serial No. 613,547

2 Claims. (Cl. 283—9)

This invention relates to printing devices in the form of relatively thin, light-weight plates adapted to be embossed with personal identification data.

Printing devices in the form of plates embossed with customer or personalized identification data represent a widely known form of instrument for conducting transactions such as credit purchasing of goods or services, and instruments of this character have been rather widely adopted for banking, department store credit sales, oil station services, record keeping and the like. Heretofore, an embossed plate of the foregoing kind has in its more common form consisted of light-weight metal of relatively small size adapted to be carried on the person, and more recently it has been proposed to utilize light-weight plastic for producing personalized instruments of the foregoing kind.

Embossed personal identification data on such a device usually take the form of type characters setting forth the name and address of the entitled person, and in many instances also numerical accounting data that facilitate record keeping. These embossures are used in printing up a record of the entailed transaction. Thus, during the course of the transaction, the person who is qualified for possession of an instrument of the foregoing kind presents the instrument to the person in charge who then uses the instrument in a well-known form of printing machine for imprinting a permanent record with the aforesaid data. This method of recording a transaction is of course highly advantageous inasmuch as many clerical errors in record keeping are eliminated due to the permanence of the embossed data used to print the record.

It is advantageous to associate more or less permanently with the instrument the customer's signature so that comparison can be made upon signed verification of the receipt or the like by the customer. Heretofore, provision of a means of associating the customer's signature with the instrument has involved usually a separate signature card of dimensions corresponding generally to the dimensions of the embossed plate, and the arrangements for associating the signature card with the plate were sometimes quite complicated contributing significantly to cost and resulting in objectionable bulkiness.

To protect the owner of the instrument having a signature associated therewith against fraudulent use by another upon loss of the instrument, it is essential that the signature be conditioned for voidance in the event one not entitled to the instrument attempts to alter a valid signature for his own use. In view of this and the foregoing, it is the primary object of the present invention to allocate a rather narrowly defined area on a plate to be embossed with personal identification data to provision of a relatively thin signature strip for placement thereon of a valid signature, and to delineate on the plate in the area allocated to the signature strip data voiding the instrument upon attempted removal of any portion of the signature strip bearing the valid signature. Specifically, it is an object of the present invention to constitute a printing device of the foregoing kind of a plate of thermoplastic material or the like having a signature strip of but a fraction of a thousandth of an inch bonded as by fusion thereto by effecting a heat seal bond between the plate and the signature strip, and to imprint the plate in the area allocated to the signature strip with descriptive data indicating voidance of the instrument upon attemped removal of the signature on the signature strip. Thus, in accordance with the present invention, a printing device is afforded having a very thin signature strip which does not contribute in any material sense to the thickness of the plate, and the signature strip is so thin that attempted erasure or erosion of the signature preliminary to the placement of a fraudulent signature on the signature strip causes immediate destruction of the signature strip to such an extent that descriptive data beneath the signature strip on the plate are immediately exposed rendering the instrument invalid.

Other and further objects of the present invention will be apparent from the following description and claims and are illustrated in the accompanying drawing which, by way of illustration, shows preferred embodiments of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

Figure 1:
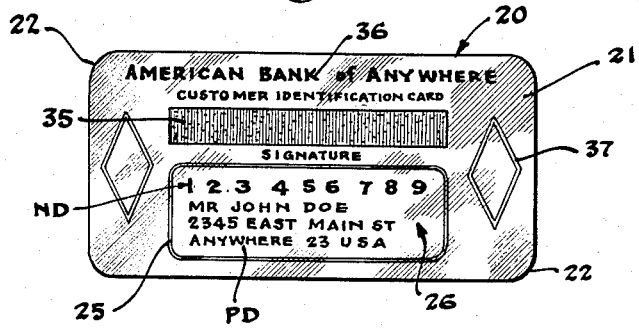
Fig. 1 is a top plan view of one form of printing device contemplated by the present invention.

One form of the present invention is illustrated in Fig. 1 of the drawing as embodied in a thin, flat, rectangular printing device or instrument 20 including a plate 21 of readily embossable material. The plate 21 is of such size as to be conveniently carried in a pocket, wallet or wallet folder, and the corners thereof are rounded at 22 to facilitate handling. It will be observed from Fig. 1 that the instrument 20 in the present instance is illustrated as being adapted for banking purposes, but it will be appreciated that this is but exemplary of one of the many and varied uses to which an instrument of this kind may be put.

The instrument as 20 or a kindred instrument has its primary use in connection with imprinting of deposit slips, sales memoranda, receipts, invoices and the like, and to this end one face of the plate 21 is imprinted with a panel outline 25 which delineates an inner area 26 provided with personal identifying data PD of the owner of the instrument, these data being in the form of embossed type characters in and on the plate 21 which delineates the name and address of the person entitled to the instrument 20. The area 26 in the present instance is also illustrated as embossed with numerical data ND which facilitate record keeping. At the time of the commercial or other transaction involving the instrument 20, the instrument 20 is arranged in a printing machine of a well-known kind in association with a record sheet, and the record sheet is imprinted from the embossed data as PD and ND.

Figure 3:
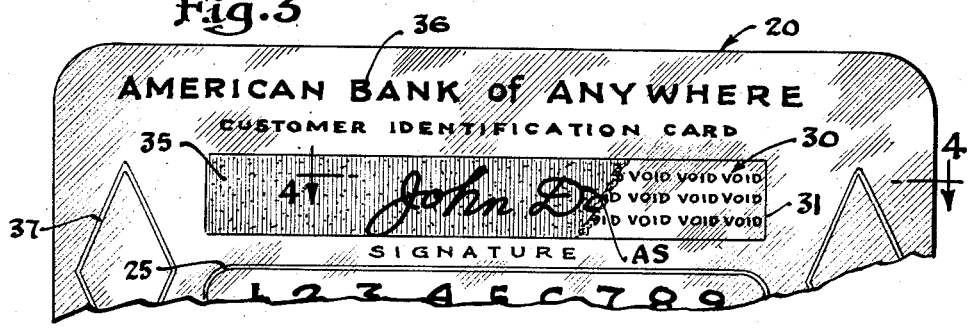
Fig. 3 is a view similar to Fig. 2 and showing voidance of the device incidental to erasure of the signature.

Referring to Fig. 3, another area 30 is defined on the side of the plate bearing the embossures PD and ND by an imprinted panel outline 31. The area 30 is allocated to the reception of a signature strip 35, Fig. 1, to be bonded to the plate 21 as will be described, and at the time the panel outlines 25 and 31 are printed on the plate 21, and also trade legends as 36 or attractive design arrangements 37, the area 30 is imprinted with descriptive data for voiding the instrument in a way to be explained, and such descriptive voidance data in the present instance consist of repetitious printing of the word "void" throughout the area 30 where the signature strip 35 is to be applied.

In accordance with the present invention, the plate 21 preferably consists of thermoplastic material such as vinyl plastic, and the signature strip 35 is preferably a known heat softenable pigment coating receptive of ink and compatable with the vinyl plastic of which the plate 21 is composed, so that the strip 35 thus composed can be readily heat sealed or bonded by fusion to the plate 21 to be coextensive with the area 30 containing pre-printed voidance data. This can be conveniently accomplished by affording the heat softenable pigment coating on a plastic carrier and transferring the pigment coating on to the plate 21 as the strip 35 by means of heat and pressure contact between the plate 21 and the side of the carrier having the pigment coating thereon as described in application Serial No. 606,756, filed August 28, 1956.

Figure 4:
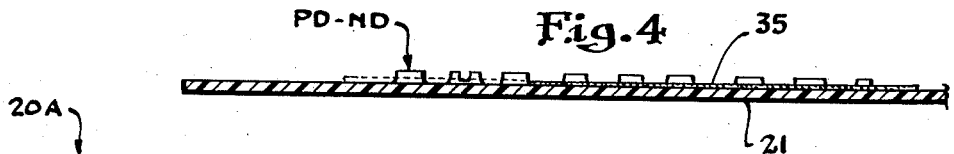
Fig. 4 is a sectional view taken substantially on the line 4—4 of Fig. 3.

As shown in Fig. 4, the strip 35 is of substantially less thickness than the plate 21, being approximately 0.00075 of an inch thick, and when bonded to the plate 21 the signature strip 35 completely masks the voidance data in the area 30. Materials other than those specifically named can of course be used in attaining the desired bonding of the signature strip to the embossed plate so long as the signature strip is receptive of ink and is so permanently united to the plate as to resist inadvertant displacement once affixed to the plate.

Figure 5:
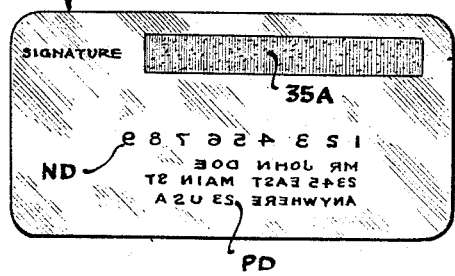
Fig. 5 is rear plan view of a printing device of the kind contemplated by the present invention showing an alternative location of the signature strip.

It will be observed from Figs. 1 and 4 that the signature strip 35 is on that side of the plate 21 where the embossed type character data PD and ND appear in relief form, but alternatively the signature strip may be provided on the reverse side of the plate as shown at 35A in Fig. 5 for a modified instrument 20A. As in the foregoing embodiment, the area on the back or reverse side of the modified plate 21A will overlie an area like the area 30 described above as delineated with voidance data.

Figure 2:
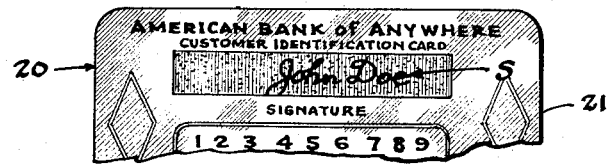
Fig. 2 is a fragmentary view of the device shown in Fig. 1 and showing the placement of a signature on the signature strip.

After a printing device of the kind contemplated by the present invention has been prepared as in the form shown in Fig. 1, this is then delivered to the person entitled to the same who places his signature on the signature strip as indicated at S in Fig. 2 thereby validating the device for his own use. As shown at AS in Fig. 3, the valid signature cannot be removed as by erasure or eradication without eroding the signature strip 35 or 35A to such an extent as to expose the underlying area as 30 bearing the voidance data. In other words, the signature strip 35 preferably of pigmented thermoplastic or heat softenable material is of such thinness and nature as to be practically completely penetrable by the marking medium used to delineate the signature S, so that the signature S cannot be removed by abrasion or dissolution by a liquid eradicator without at the same time removing a corresponding portion of the signature strip to bare the voidance data.

It will be seen from the foregoing that under the present invention a printing device or instrument of a highly convenient order is afforded having bonded thereto a signature strip that does not contribute materially to the thickness of the plate included in the instrument, and the plate bearing the embossed data is printed or otherwise delineated with voidance data in the area beneath the signature strip, these data being exposed when there is an attempt to alter the valid signature as by erasure or attempted eradication thereof.

Hence, while I have illustrated preferred embodiments of the present invention, it is to be understood that these are capable of variation and modification, and I therefore do not wish to be limited to the precise details set forth, but desire to avail myself of such changes and alterations as fall within the purview of the following claims.

I claim:

1. A device of the kind described comprising a generally rectangular one-piece plate of thin light-weight embossable thermoplastic plastic material, said thermoplastic plate having an area thereof allocated to the reception of embossed personal identification data in the form of permanent embossed type characters, and said plate having at another area a signature receiving medium in the form of a discrete individual signature receiving strip overlying said other area and applied in place on said plate in strip form, said strip being of a heat bondable thermoplastic material heat bonded in place to the thermoplastic plate to overlie said other area, said other area beneath the signature receiving surface of the thermoplastic strip bearing indicia voiding the device upon removal of a portion of said strip by attempted removal of even a portion of a signature placed on said strip.

2. A printing and identification device comprising a plate of thin light-weight thermoplastic plastic material having an area provided with embossed type characters, and having at another area a signature receiving medium of a heat bondable thermoplastic material applied in place on said plate in strip form and heat bonded in place to the plate, said thermoplastic strip being composed to afford an opaque signature receptive surface for a written signature and being but a small fraction of an inch thick, said other area of the plate beneath the thermoplastic signature strip being solid and uninterrupted and bearing data voiding the device upon removal of a portion of said strip by attempted removal of even a portion of said thermoplastic strip bearing said signature.

References Cited in the file of this patent

UNITED STATES PATENTS

| | | |
|---|---|---|
| 384,291 | Shepard | June 12, 1888 |
| 1,479,534 | Curtis | Jan. 1, 1924 |
| 1,911,774 | Smith | May 30, 1933 |
| 2,520,077 | Wolowitz | Aug. 22, 1950 |
| 2,557,652 | Gollwitzer | June 19, 1951 |
| 2,780,015 | Whitehead | Feb. 5, 1957 |